(12) United States Patent
Tornambe et al.

(10) Patent No.: US 11,126,805 B2
(45) Date of Patent: Sep. 21, 2021

(54) METHOD FOR ADJUSTING PHASE IN CONTACTLESS COMMUNICATION

(71) Applicant: STMicroelectronics (Rousset) SAS, Rousset (FR)

(72) Inventors: Anthony Tornambe, Rousset (FR); Nicolas Cordier, Aix-en-Provence (FR)

(73) Assignee: STMICROELECTRONICS (ROUSSET) SAS, Rousset (FR)

( * ) Notice: Subject to any disclaimer, the term of this patent is extended or adjusted under 35 U.S.C. 154(b) by 17 days.

(21) Appl. No.: 16/374,837

(22) Filed: Apr. 4, 2019

(65) Prior Publication Data
US 2019/0325177 A1 Oct. 24, 2019

(30) Foreign Application Priority Data

Apr. 24, 2018 (FR) ...................................... 1853557

(51) Int. Cl.
| | |
|---|---|
| G06K 7/10 | (2006.01) |
| G06K 19/07 | (2006.01) |
| G06K 7/00 | (2006.01) |
| H04B 5/00 | (2006.01) |

(52) U.S. Cl.
CPC ....... *G06K 7/10366* (2013.01); *G06K 7/0095* (2013.01); *G06K 7/10237* (2013.01); *G06K 19/0723* (2013.01); *H04B 5/0062* (2013.01)

(58) Field of Classification Search
CPC ........... G06K 7/10237; G06K 7/10148; G06K 19/0726
USPC ...... 235/492; 340/572.1, 572.2, 572.4, 572.5
See application file for complete search history.

(56) References Cited

U.S. PATENT DOCUMENTS

| | | | |
|---|---|---|---|
| 7,671,720 B1 | 3/2010 | Martin et al. | |
| 2007/0296593 A1* | 12/2007 | Hall ................... | G06K 19/0723 340/572.7 |
| 2012/0071089 A1 | 3/2012 | Charrat et al. | |
| 2012/0238899 A1* | 9/2012 | Bacquet ............. | G06K 19/0723 600/549 |
| 2014/0038662 A1* | 2/2014 | Alberth, Jr. ......... | H04B 1/0458 455/550.1 |
| 2016/0197718 A1 | 7/2016 | Michel et al. | |

(Continued)

FOREIGN PATENT DOCUMENTS

| | | |
|---|---|---|
| EP | 2431925 A1 | 3/2012 |
| EP | 2500840 A1 | 9/2012 |

(Continued)

*Primary Examiner* — Suezu Ellis
(74) *Attorney, Agent, or Firm* — Slater Matsil, LLP

(57) ABSTRACT

An object is capable of contactless communication with a reader by active charge modulation. The object includes an antenna, an impedance matching circuit, a memory, and a controller connected to the antenna through the impedance matching circuit. The antenna, the an impedance matching circuit and the controller together form a resonant circuit having a resonant frequency. The controller is configured to cause the object to transmit, in the absence of a signal received from a reader, a signal at the resonant frequency, to determine a characteristic obtained from the signal uniquely transmitted by the object, and to perform an adjustment of a phase shift within the object based on the characteristic and an indication stored in the memory, the indication linking values of phase shifts with values of the characteristic.

26 Claims, 6 Drawing Sheets

(56) References Cited

U.S. PATENT DOCUMENTS

2018/0034505 A1    2/2018  Dedieu et al.
2018/0034510 A1*   2/2018  Hueber ................ H04B 5/0075
2018/0070198 A1*   3/2018  Cho ........................ H04B 5/02

FOREIGN PATENT DOCUMENTS

EP          3244351 A1    11/2017
EP          3276986 A1     1/2018
EP          3280064 A1     2/2018

\* cited by examiner

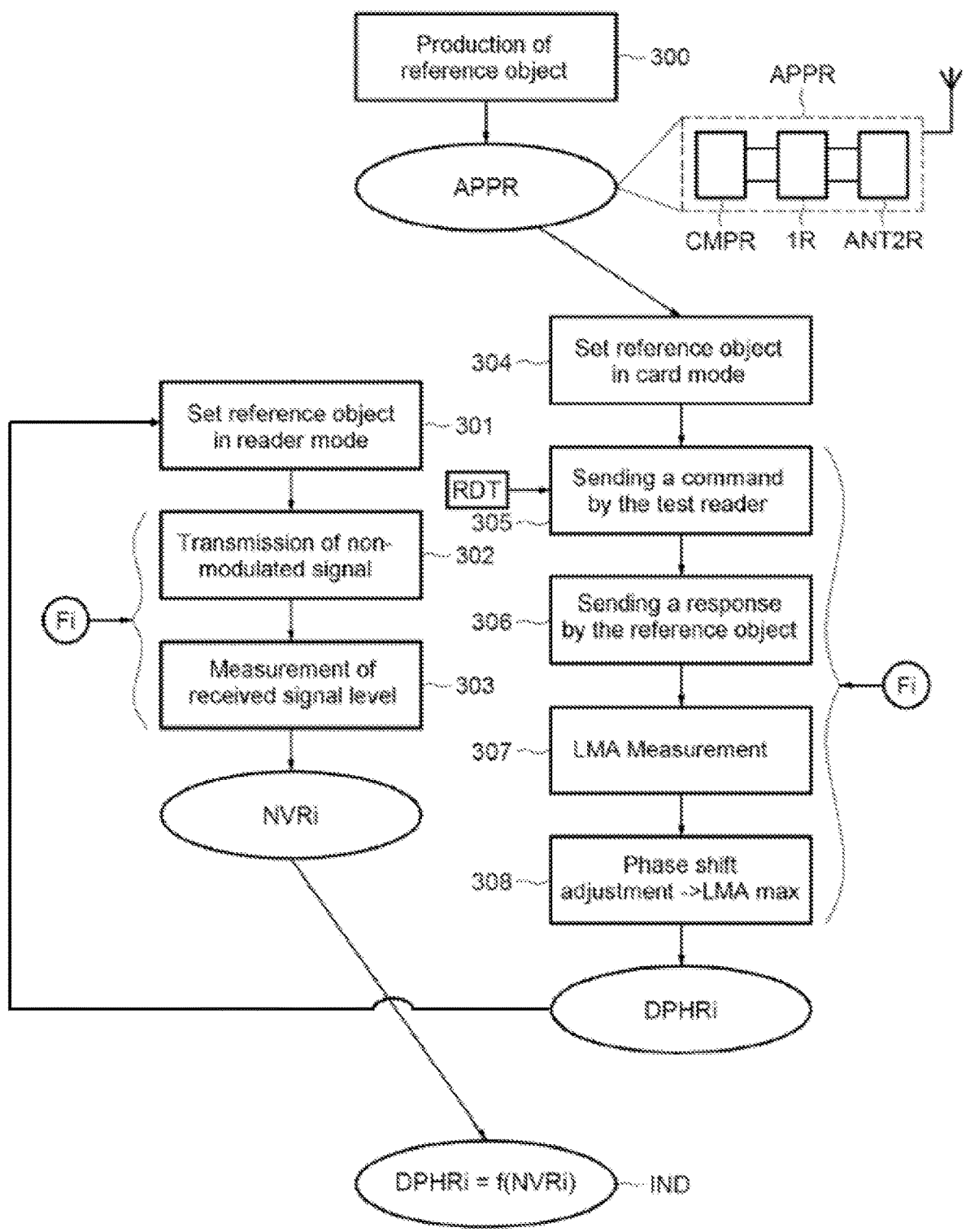

METHOD FOR ADJUSTING PHASE IN CONTACTLESS COMMUNICATION

CROSS-REFERENCE TO RELATED APPLICATIONS

This application claims priority to French Patent Application No. 1853557, filed on Apr. 24, 2018, which application is hereby incorporated herein by reference.

TECHNICAL FIELD

Implementations and embodiments of the invention relate a method for adjusting phase in contactless communications.

BACKGROUND

Near field communication (NFC) is a wireless connectivity technology that allows communication over a short distance, for example 10 cm, between electronic devices, such as for example contactless smart cards or mobile telephones emulated in card mode, and readers.

The NFC technology is particularly suitable for connecting any type of user device and allows fast and easy communications.

A contactless object is an object capable of exchanging information, via an antenna, with another contactless object, for example a reader, according to a contactless communication protocol. An NFC object, which is a contactless object, is an object compatible with the NFC technology.

The NFC technology is an open technological platform standardized in the ISO/IEC 18092 and ISO/IEC 21481 standards but incorporates numerous already existing standards, such as for example the type A and type B protocols defined in the ISO-14443 standard, which can be communication protocols usable in the NFC technology.

In addition to its conventional telephone function, a cellular mobile telephone can be used (if it is equipped with specific circuitry) for exchanging information with another contactless device, for example, a contactless reader, by using a contactless communication protocol usable in the NFC technology.

This makes it possible to exchange information between the contactless reader and secure elements situated in the mobile telephone. Numerous applications are thus possible such as mobile ticketing in public transport systems (the mobile telephone behaves like a travel ticket) or mobile payment (the mobile telephone behaves like a payment card).

During a transmission of information between a reader and an object emulated in tag or card mode, the reader generates a magnetic field by means of its antenna which is generally, within the conventionally used standards, a sinusoidal wave at 13.56 MHz. The strength of the magnetic field is between 0.5 and 7.5 amps/meter RMS (RMS standing for "Root Mean Square" in English).

Two operating modes are then possible, a passive mode or an active mode.

In the passive mode, only the reader generates the magnetic field and the object, emulated in tag or card mode, always assumes the role of the target. More precisely, the antenna of the object emulating the tag or the card modulates the field generated by the reader. This modulation is carried out by modifying the load connected to the terminals of the antenna of the object.

By modifying the load on the terminals of the antenna of the object, the output impedance of the antenna of the reader changes because of the magnetic coupling between the two antennas. This results in a change in the amplitudes and/or the phases of the voltages and currents present at the level of the antennas of the reader and of the object.

Moreover, in this way, the information to be transmitted from the object to the reader is transmitted by modulation of load on the currents of the reader's antenna.

The load variation carried out during the load modulation results in an amplitude and/or phase modulation of the signal (voltage or current) at the level of the antenna of the reader. A copy of the antenna current is generated and injected into the reception chain of the reader where this current is demodulated and processed in order to extract the transmitted information.

In the active operating mode, the reader and the object emulated in card mode both generate an electromagnetic field. Generally, this operating mode is used when the object is provided with its own power source, for example a battery, as is the case in a cellular mobile telephone which is then emulated in card mode. Each of the NFC devices transmits the data using a modulation scheme, typically an amplitude modulation scheme of the ASK (Amplitude Shift Keying) type.

Here again, the modulation results in a load modification and the expression "Active Load Modulation" is used.

In comparison with a passive communication mode, longer operating ranges are obtained which can be as long as 20 cm depending on the protocol used. Moreover, the use of active load modulation makes it possible to use very small antennas.

This being so, this type of communication by active load modulation gives rise to other problems. In fact, during the active periods of communication of the device emulated in card mode, the electromagnetic field of the reader is not directly observable. This can result in a non-synchronous response of the object emulated in card mode and consequently in a signal received by the reader exhibiting a phase shift.

Thus it is desirable that, during an active load modulation communication, the signal transmitted by the device emulated in card mode is in phase or in phase opposition with the signal received by the reader in order to have the highest possible amplitude of modulation in absolute value at the level of the reader and therefore also at the level of the device emulated in card mode.

A phase adjustment is generally carried out at the level of the device emulated in card mode during the development of the device in a known environment and with a well-adjusted impedance matching circuit.

However, during the production of the device, notably because of dispersions in the values of the various components, the matching is not the optimum matching resulting in a dispersion of the performances of the device in card mode.

SUMMARY

Implementations and embodiments of the invention relate to wireless communication between a reader and an object, for example but not in a limiting manner, a mobile telephone emulated in card mode, in particular an NFC (Near Field Communication) object, and more particularly the compensation of a phase shift between the signal transmitted by the object and the one received by the reader during a communication by active load modulation (ALM standing for "Active Load Modulation").

In a general example two independent devices are considered, namely the reader and an object emulated in card mode, capable of contactless communication by active charge modulation. Embodiments of the invention provide a method to reduce by a maximum amount or even to eliminate the phase shift.

According to one implementation and embodiment, it is proposed to carry out such a phase compensation in the object emulated in card mode, in a simple manner, without necessitating the cooperation of a reader, once and for all at the end of production of the object, that is to say before its operational use.

According to an implementation and embodiment, there is therefore proposed an object, capable of being emulated in card mode, for example a telephone, a tablet, a smart watch, these examples not being limiting. The object is configured for, at the end of assembly and production, carrying out an auto-adjustment of a phase shift peculiar to that object, on the basis for example of a measurement of the level of the signal received on the input terminals of the controller, for example, an NFC controller, of the object after a transmission of a non-modulated signal by that object set in reader mode, and of a correspondence table, stored in a memory of that object and resulting from adjustments carried out on a reference object exhibiting in particular an optimum matching.

Moreover, as indicated above, this auto-adjustment is advantageously carried out at the end of production and assembly, without necessitating the presence of a reader, and once and for all without it being necessary subsequently to repeat such an adjustment, in particular during subsequent communications between the object and the reader.

According to one aspect, there is proposed a method for adjusting an object capable of contactless communication with a reader by active load modulation.

This method comprises production of a reference object structurally and functionally analogous to the object and comprising a reference resonant circuit tuned to a reference resonant frequency, for example 13.56 MHz. Determinations, for different frequencies within a range of frequencies about the reference resonant frequency, of reference phase shifts within the reference object make it possible to obtain resultant phase shifts that are zero or equal to pi to within a tolerance, between a signal transmitted by the reference antenna of the reference object to a test reader, for example, a reader of a certification bench defined in the EMVCo standard, and a signal received from the test reader at the level of the reference antenna.

It will be sought to obtain maximum resultant phase shifts for the reference object of zero or equal to pi and in practice the tolerance can be fixed at plus or minus a few degrees, for example, 5 degrees.

The amplitude of the modulation can be positive or negative depending on whether the signal transmitted by the antenna and the signal received from the test reader are in phase opposition or in phase.

Thus, for example, obtaining resultant phase shifts that are equal to or close to 0 or to pi is equivalent to obtaining positive modulation amplitudes higher than a threshold and preferably as high as possible. The threshold can for example be equal to 95% of the maximum possible positive amplitude of modulation.

The method according to this aspect also comprises a production of the object (a production of the object) including a storage in a memory of the object of at least one indication linking these reference phase shifts with reference characteristics obtained on the basis of signals uniquely transmitted by the reference object.

These reference characteristics are obtained on the basis of signals uniquely transmitted by the reference object, that is to say without the presence of a signal received from the test reader because, as will be seen below, the phase of adjusting the object's own phase shift is carried out without the presence of a reader.

The method according to this aspect therefore also comprises, after the object has been produced, an auto-adjustment by the object of the phase shift within that object on the basis of the at least one stored indication and of at least one characteristic obtained on the basis of a signal uniquely transmitted by the object, the at least one characteristic being of the same type as the reference characteristics.

Preferably, this characteristic can be a signal level received at the input of the controller, or it can be the phase of the transmitted signal or again the consumption during the transmission.

Thus, for a given type of object, for example a type of mobile telephone, a reference object is produced of which the matching circuit and the antenna have restive, capacitive and inductive values precisely adjusted in such a way as to exhibit a reference resonant frequency, typically a frequency of 13.56 MHz in the case of type A or B protocols of the ISO-14443 standard and for this reference object there are determined reference phase shifts corresponding to different values of the frequency about the reference frequency.

Then, after the production (or production) of the object, the object is made to transmit a signal, in the absence of a reader, and the measurement of at least one characteristic obtained on the basis of that signal combined with a stored indication, for example a correspondence table or law, makes it possible to adjust the object's own phase shift which will make it possible to obtain, during subsequent operational communications with a reader, a limited phase shift between the signal transmitted by the object and the signal received from the reader. Moreover, this adjustment of the object's own phase shift notably does not necessitate either the knowledge of the resonant frequency of the resonant circuit of the object or the knowledge of the real values of the components of the impedance matching circuit.

In practice, the reference object comprises a reference controller connected to a reference antenna by the intermediary of a reference impedance matching circuit and together forming the reference resonant circuit.

The reference phase shifts are advantageously phase shifts between signals transmitted at the output of the reference controller and signals received at the input of the reference controller.

Thus there will be determined, in the reference object, the reference controller's phase shifts which are intended for compensating for the phase shifts due to the components of the transmission path and those due to the components of the reception path of the reference object.

Thus, in the object at the end of production, there will be adjusted the phase shifts of the object's controller which are also intended for compensating for the phase shifts due to the components of the transmission path and those due to the components of the reception path of that object.

According to a preferred implementation, the reference characteristics comprise reference levels of received signals resulting from the signals uniquely transmitted by the reference object and the at least one characteristic comprises a level of a received signal resulting from the signal uniquely transmitted by the object.

Moreover, as indicated above, the reference levels of the received signals are, for example, the reference levels of signals received at the input of the reference controller and the level of a received signal resulting from the signal uniquely transmitted by the object is for example the level of the signal received at the input of the object's controller.

Both the reference object and the produced object are advantageously capable of operating in reader mode or in card mode.

Moreover, the determinations of the reference phase shifts can comprise a setting of the reference object in its card mode and, for each frequency of the range of frequencies, a transmission by the test reader of a test signal, for example, a command conforming with the protocol used, a reception by the test reader of the response signal transmitted by the reference object, and an adjustment of the reference phase shift in the reference object in order to obtain at the level of the test reader an amplitude of modulation higher in absolute value than a threshold, for example equal to 95% of the maximum positive amplitude of modulation. The determinations of the reference phase shifts can also comprise a setting of the reference object in its reader mode and, for each frequency of the range of frequencies, a transmission by the reference object of a non-modulated signal having the frequency and a determination of the reference level of the signal received by the reference controller because of that transmission, and an elaboration of a relationship of correspondence between the different values of reference levels of the of the received signals and the corresponding values of reference phase shifts, the stored indication being representative of the relationship.

The indication can comprise a table of correspondence between the different values of reference levels of the received signals and the corresponding values of reference phase shifts.

The inventors have observed that the relationship is a straight line. Moreover, as a variant, the indication can comprise values making it possible to characterize the straight line, such as for example the slope and one point of the straight line, or two points on the straight line.

According to one implementation, the auto-adjustment by the object can comprise a setting of the object in reader mode, a transmission by the object of a non-modulated signal at the frequency of the resonant circuit of the object, a determination of the level of the signal received by the object's controller, and an adjustment of the phase shift on the basis of the level and of the stored indication.

Just like the reference object, the object comprises a controller connected to an antenna by the intermediary of an impedance matching circuit and together forming a resonant circuit having a resonant frequency. A signal transmitted by the antenna of the object stems from an initial signal generated within the controller, and the auto-adjustment of the phase shift then comprises for example an adjustment of a delay on the initial signal.

The object can for example be a communication device, such as a mobile telephone or a tablet.

According to another aspect, there is proposed an object capable of contactless communication with a reader by active charge modulation, comprising a controller connected to an antenna by the intermediary of an impedance matching circuit and together forming a resonant circuit having a resonant frequency, a memory containing an indication resulting from the application of the method defined above, the controller being configured for carrying out an auto-adjustment of that object's phase shift in accordance with the method defined above.

According to another aspect, there is proposed an object capable of contactless communication with a reader by active load modulation, the object comprising a controller connected to an antenna by the intermediary of an impedance matching circuit and together forming a resonant circuit having a resonant frequency, the controller being configured for making the object transmit, in the absence of a signal received from a reader, a signal at the frequency of the resonant circuit of the object, determining at least one characteristic obtained from the signal uniquely transmitted by the object, and carrying out an adjustment of a phase shift within the object on the basis of the at least one characteristic and of an indication stored in a memory of the object and linking values of phase shifts with values of the at least one characteristic.

According to one embodiment, the phase shift is a phase shift between a signal transmitted at the output of the controller and a signal received at the input of the controller.

According to one embodiment, the at least one characteristic comprises the level of the signal received at the input of the controller resulting from the signal uniquely transmitted by the object.

When the object is capable of operating in reader mode or in card mode, the controller is configured for, in one embodiment, setting the object in reader mode, making the object transmit a non-modulated signal at the frequency of the resonant circuit of the object, determining the level of the signal received at the input of the controller of the object, and carrying out an adjustment of the phase shift between the transmitted signal and the signal received on the basis of the level of the received signal and of the stored indication.

The indication can comprise a table of correspondence between different values of levels of received signals and corresponding values representative of the phase shifts.

As a variant, the indication can comprise values making it possible to characterize a straight line representative of the evolution of the values of phase shifts as a function of values of levels of received signals.

According to one embodiment, the controller comprises an adjustable delay element disposed in the transmission path of the signals and a circuit for adjusting the value of the delay in such a way as to obtain the desired phase shift.

The controller is for example a controller compatible with a near field communication (NFC) technology.

The object can thus be a communication device, such as a mobile telephone or a tablet, or furthermore a smart watch, without these examples being limiting.

BRIEF DESCRIPTION OF THE DRAWINGS

Other advantages and features of the invention will become apparent on examination of the detailed description of implementations and embodiments, which are in no way limiting, and of the appended drawings in which:

FIGS. 1 to 10 show different implementations and embodiments of the invention.

DETAILED DESCRIPTION OF ILLUSTRATIVE EMBODIMENTS

Figure 1:
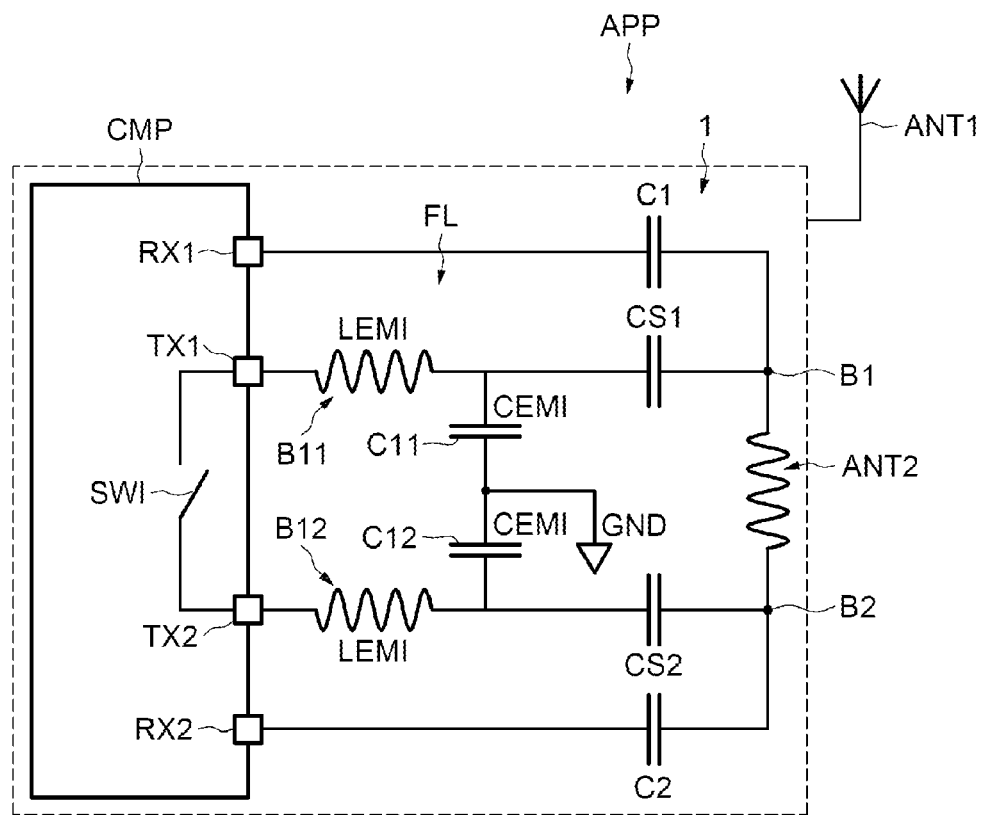
Figure 2:
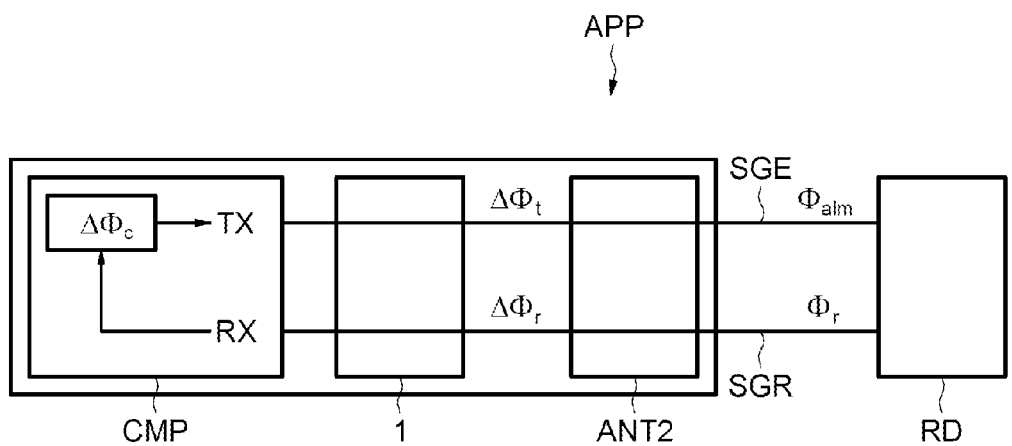

In FIG. 1, the reference APP denotes an object, in this case a communication device, for example a cellular mobile telephone, equipped with an antenna ANT1 for establishing telephone communications.

In the present case, the device APP also comprises a conventional NFC system comprising a contactless component CMP of the NFC type, for example an NFC controller or microcontroller.

In this case the device is capable of contactless communication with a reader by active load modulation.

The microcontroller CMP conventionally has two contacts TX1, TX2 usable in reader mode and two other contacts RX1, RX2 usable in reader mode and in card mode.

In this respect, the component CMP can be equipped with an internal switch SWI making it possible to short-circuit the terminals TX1 and TX2 for operation in card mode or not to short-circuit the terminals TX1 and TX2 in order to authorize operation in reader mode.

An antenna ANT2, for example an inductive winding, is usable for contactless communication with an external device. A first terminal B1 of this antenna ANT2 is connected to the contacts TX1 and RX1 whereas the second terminal B2 of the antenna ANT2 is connected to the contacts TX2 and RX2.

Finally an external impedance matching circuit 1 is connected between the antenna ANT2 and the component CMP.

More precisely, in a way which is conventional and known per se, this impedance matching circuit can comprise a filter FL intended to filter out electromagnetic interference (EMI filter).

This filter FL is conventionally a filter of the LC type in this case comprising a coil B11 connected in series between the contact TX1 and ground GND, with a capacitor C11.

The filter FL also comprises a coil B12 connected in series between the contact TX2 and ground GND, with a capacitor C12.

The inductance of the coil B11 and of the coil B12 is equal to LEMI whilst the capacitive value of the capacitors C11 and C12 is equal to CEMI.

These two values respectively form a reference inductance and a reference capacitive value for the EMI filter EMI.

These reference values are associated with a cut-off frequency of the EMI filter, hereafter referred to as reference cut-off frequency (for example 20 MHz for a carrier frequency of 13.56 MHz).

Moreover, these reference values LEMI and CEMI are chosen so as to form a resonant circuit in the vicinity of the reference cut-off frequency f of the filter FL.

The impedance matching circuit also comprises the capacitors C1, C2, CS1 and CS2.

The capacitors C1 and C2 form a capacitive divider at the terminals of the contacts RX1 and RX2.

With regard to the capacitors CS1 and CS2, these are chosen in such a way as to maximize the current in the antenna ANT2 in order to increase the amplitude of the electromagnetic field.

In order to have optimized operation, the component CMP forms, with the antenna ANT2 and the external impedance matching circuit, a resonant circuit having a resonant frequency equal to the carrier frequency, for example 13.56 MHz in the case of a type A or type B communication protocol defined in the ISO/IEC 14443 standard.

This being so, during the actual production of the external impedance matching circuit, the real inductances and the real capacitive values of the different elements of this external impedance matching circuit can vary with respect to the theoretical values notably because of the technological spread of the coils and capacitors used.

In normal use, the reader transmits a signal SGR which exhibits a phase $\phi r$. The communication device in card mode responds to the commands of the reader with a signal SGE at the same frequency and exhibiting the phase $\phi alm$ which is equal to:

$$\phi_{alm}=\phi_r+\Delta\phi_r+\Delta\phi_c+\Delta\phi_t$$

There is therefore a phase shift equal to $\phi_{alm}-\phi_r$ between the signal transmitted by the object and the signal received from the reader.

The phase shift $\Delta\phi_t$ is due to the components (resistors, capacitors, inductances) of the transmission path whilst the phase shift $\Delta\phi_r$ is due to the components (resistors, capacitors, inductances) of the reception path.

$\Delta\phi_r$ and $\Delta\phi_t$ vary from one communication device to another because of the tolerances of the components and of the antenna ANT2. The tolerances of the antenna depend on the mechanical tolerances of the antenna and also on the mechanical tolerances of the assembly because of the presence of metal parts in the proximity of the antenna.

$\Delta\phi_c$ is a configurable parameter in the component CMP stored in memory.

A unique parameter for the whole production of devices is not sufficient because of the tolerances mentioned above.

By way of indication, the phase variations induced by these tolerances can be as much as 120 degrees, that is to say plus or minus 60 degrees for the phase $\phi_{alm}$.

The amplitude LMA of the charge modulation generated by a device APP shifted by 60 degrees is reduced to half of the maximum value obtained with a well-adjusted device and this gives rise to interoperability problems with certain readers.

Moreover, the infrastructure of contactless readers is not frequently renewed, particularly in the public transport field and the communication device must operate with old readers with limited performance (simple envelope detection reception architecture unlike architectures having two channels I and Q in phase quadrature).

Moreover, these readers were originally designed to operate with contactless cards using a passive load modulation.

According to one aspect of the invention, there is proposed an auto-adjustment phase at the end of production, or calibration phase, aimed at determining the phase compensation $\Delta\phi_c$ for each device APP produced in such a way as to bring back the phase variation $\phi_{alm}$ for example to plus or minus 15 degrees over the whole of the production.

Moreover, as will be seen below, this auto-adjustment makes it possible to determine $\Delta\phi_c$ without the use of a test reader.

In fact, as the inputs and outputs RX1, RX2, TX1, TX2 of the component CMP are connected to the same matching circuit and to the same antenna present in the communication device, it is possible to determine this compensation $\Delta\phi_c$ by measuring the characteristics of a signal spontaneously transmitted by the communication device during this auto-adjustment phase, and to do this without it being necessary to have a signal received from the reader and therefore without the presence of a reader.

As a function of the measured characteristics, there is then determined, for each device, the error $\Delta\phi_c$ via a law or a table so as to compensate for the variations in $\Delta\phi_r$ and $\Delta\phi_t$ in order to keep the phase of the signal $\phi_{alm}$ within a limited phase range.

Thus law or this table which is stored in the memory of the device during its production, before the auto-adjustment or self-test phase, is obtained, as will be seen in more detail below, with the help of a reference object or device and a test reader, for example the reader of a test bench conforming with the EMVCo standard.

The reference object or device is a device that is structurally and functionally analogous to the device APP produced but in particular having an impedance matching circuit and an antenna produced with components, the values of which are perfectly controlled, which makes it possible to have for the resonant circuit formed and the matching circuit, a reference resonant frequency typically equal to the frequency of the carrier, for example 13.56 MHz.

FIGS. 3 to 6 are now referred to more particularly in order to illustrate a non-limiting example of implementation of the method according to the invention relating more particularly to the elaboration of the law or of the table which will be stored in the memory of the object for the purpose of its self-testing or auto-adjustment.

Moreover, in the example which is be described below, the characteristic of the transmitted signal which will be taken into account is the level of the signal received at the input of the controller and resulting from the transmission of the signal at the level of the antenna, when the object is set in reader mode.

As indicated above, this elaboration of the law or of the table makes use of the reference object.

More precisely, in this preferred example there will be elaborated, by using this reference object, a relationship of correspondence between different values reference levels of signals received at the input of the reference controller and corresponding values of reference phase shifts, and an indication (the law or the table) representative of the relationship will be stored.

In a step 300, there is produced the reference object or device APPR comprising a reference controller CMPR, a reference impedance matching circuit 1R and a reference antenna ANT2R.

Then, the reference object is set into reader mode (step 301).

Moreover, for each frequency Fi within a range of frequencies about the reference resonant frequency (for example 13.56 MHz), the reference object is made to transmit a non-modulated signal.

As this non-modulated signal (step 302) is transmitted at the level of the antenna of the reference device, the latter will capture a received signal level which will be measured (step 303) at the input terminals RX1, RX2 of the component CMP (NFC controller) of the reference object.

This is carried out in a conventional manner by using for example an analogue to digital converter integrated in the component CMP.

A level NVRi of signal received at the input of the component CMP is thus obtained, this level NVRi being associated with the frequency Fi.

Figure 4:
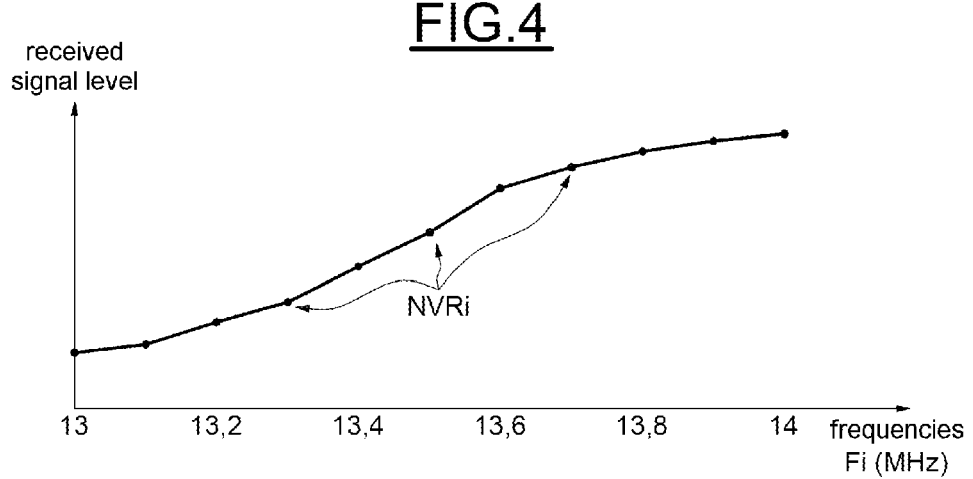

By repeating this operation for the frequencies Fi of the range of frequencies, there is therefore obtained, as shown in FIG. 4, a set of levels NVRi, each level NVRi being associated with a frequency Fi.

The purpose of another operation is to determine, for each frequency Fi, the phase shift DPHRi (corresponding to the compensation $\Delta\phi_c$) suitable for the reference controller, in such a way as to obtain an amplitude of modulation LMA greater than a threshold, typically the highest possible in absolute value.

Figure 3:
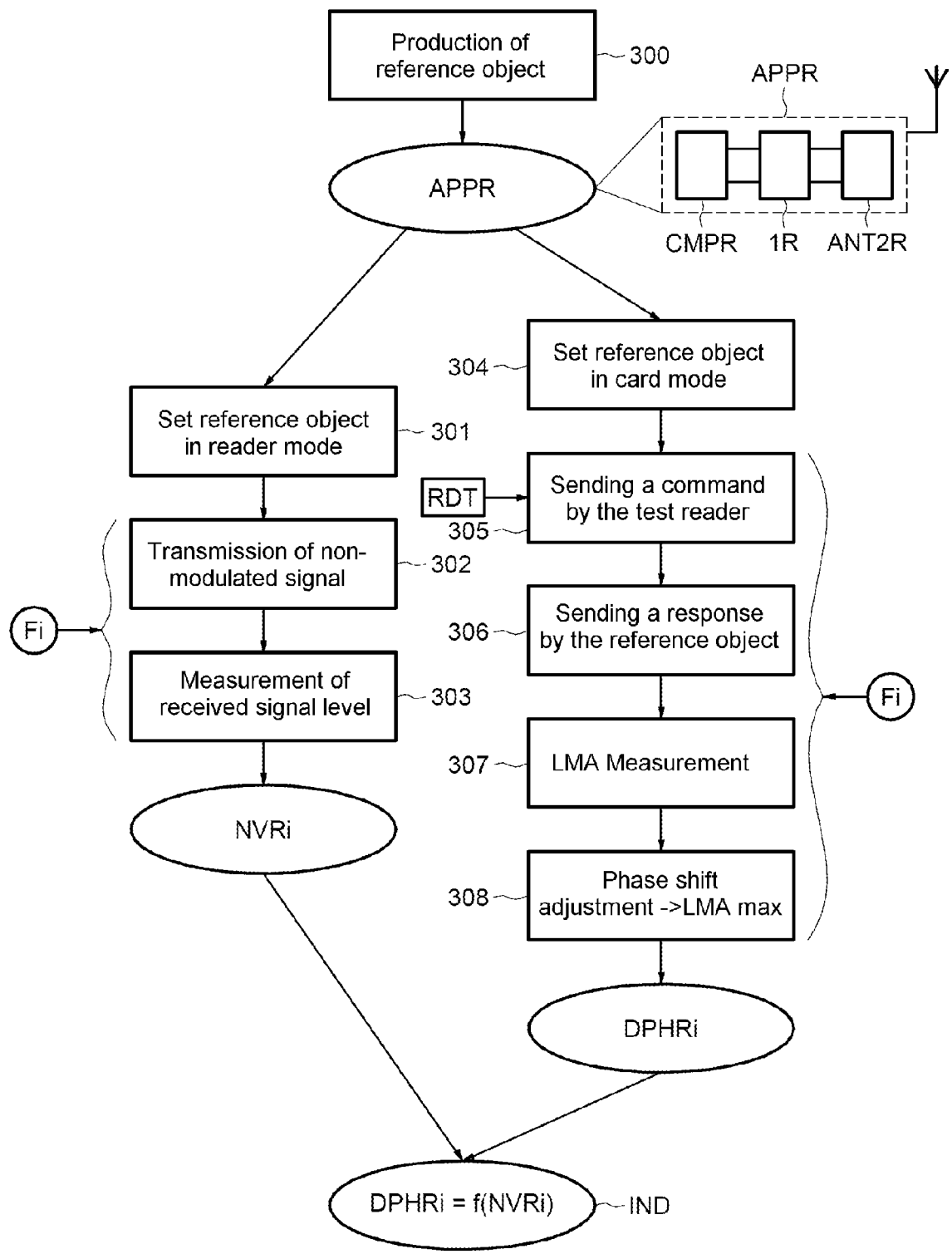

These operations, illustrated by steps (304) to (308) in FIG. 3, can be carried out before or after steps (301) to (303) as shown in FIG. 10, for example.

This time therefore, the reference object or device is set in card mode (step 304).

Then, the test reader RDT, for example a test reader of an EMVCo test bench, is made to send a command (step 305).

As the reference object is in card mode, it will respond to this request by sending a response (step 306).

The command has a phase shift with respect to the response.

The amplitude of modulation LMA is then measured at the level of the reader of the test bench.

Figure 5:
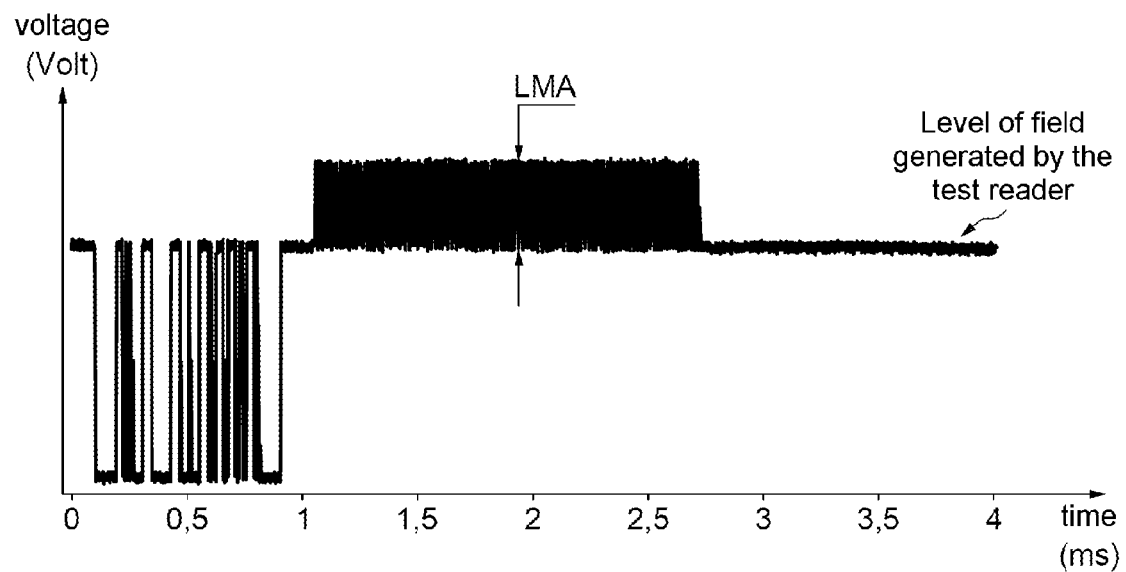

This is illustrated in FIG. 5.

More precisely, the amplitude of modulation LMA corresponds to the voltage difference with respect to the level of the field generated by the test reader.

When the signal transmitted by the object and the signal transmitted by the reader are in phase, this amplitude is positive whereas it is negative when these two signals are in phase opposition.

The phase shift DPHRi is then adjusted in the reference device in such a way as to obtain a level of amplitude LMA, for example a positive level, greater than a threshold. This threshold can for example be equal to 95% of the maximum.

This being so, in practice it will be sought to obtain a phase shift DPHRi resulting in the maximum level of the amplitude LMA.

Figure 6:
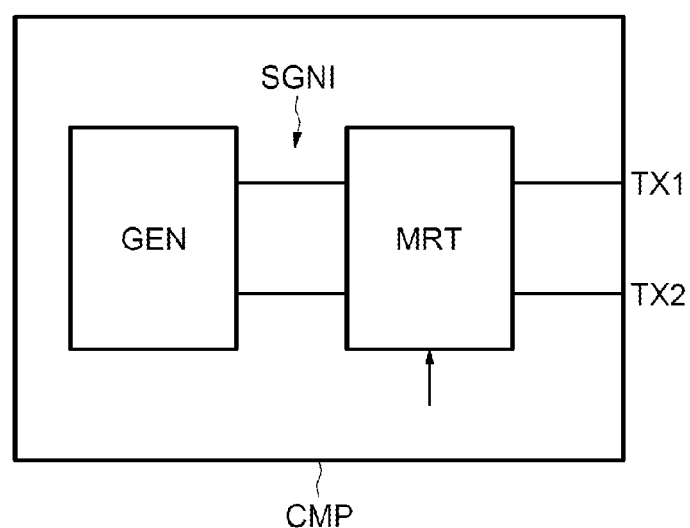

In practice, the adjustment of the phase shift, as illustrated in FIG. 6, by adjusting the delay value of the delay element MRT disposed in the transmission path of the component CMP and intended to delay the initial signal generated by circuit GEN of generation of the response.

There is in fact a direct relationship between the value of the delay and the value of the reference phase shift DPHRi.

Figure 7:
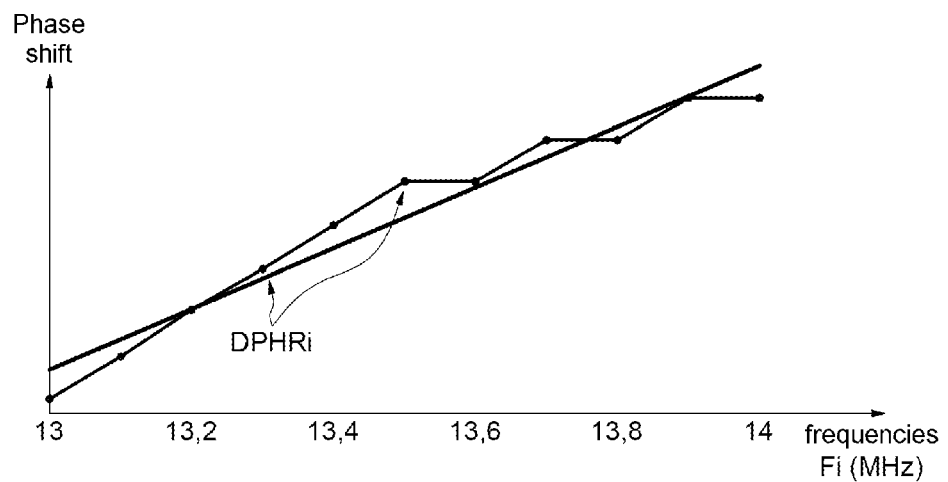

Steps (305) to (308) are repeated for all of the frequencies Fi of the range of frequencies and there is then obtained, as illustrated in FIG. 7, a set of reference phase shifts DPHRi respectively associated with the different frequencies Fi.

Figure 8:
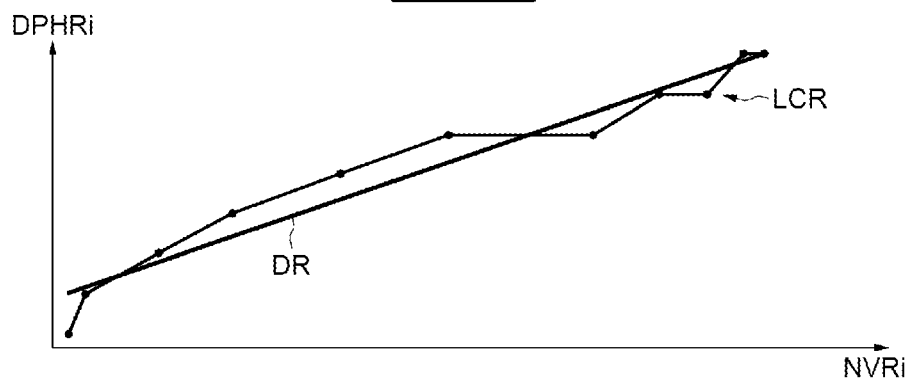

After this, it is possible, as shown in FIG. 8, to establish a relationship of correspondence between the different reference phase shifts DPHRi and the different received signal levels NVRi.

The correspondence relationship LCR can then for example be approximated by a straight line DR.

After this, it is possible to define an indication making it possible to define this correspondence relationship LCR (FIG. 8).

This indication IND (FIG. 3) can be a correspondence table comprising all of the pairs of points DPHRi, NVRi respectively corresponding to the frequencies Fi. As a variant, it is possible to provide, as in indication IND, parameters making it possible to characterize the function DPHRi=f(NVRi), in this case the straight line DR, such as for example the slope of the straight line DR and a point on that straight line, or two points on that straight line DR.

It would of course be possible to replace the reference phase shift values DPHRi by the corresponding delay values having made it possible to obtain these reference phase shifts.

Figure 9:
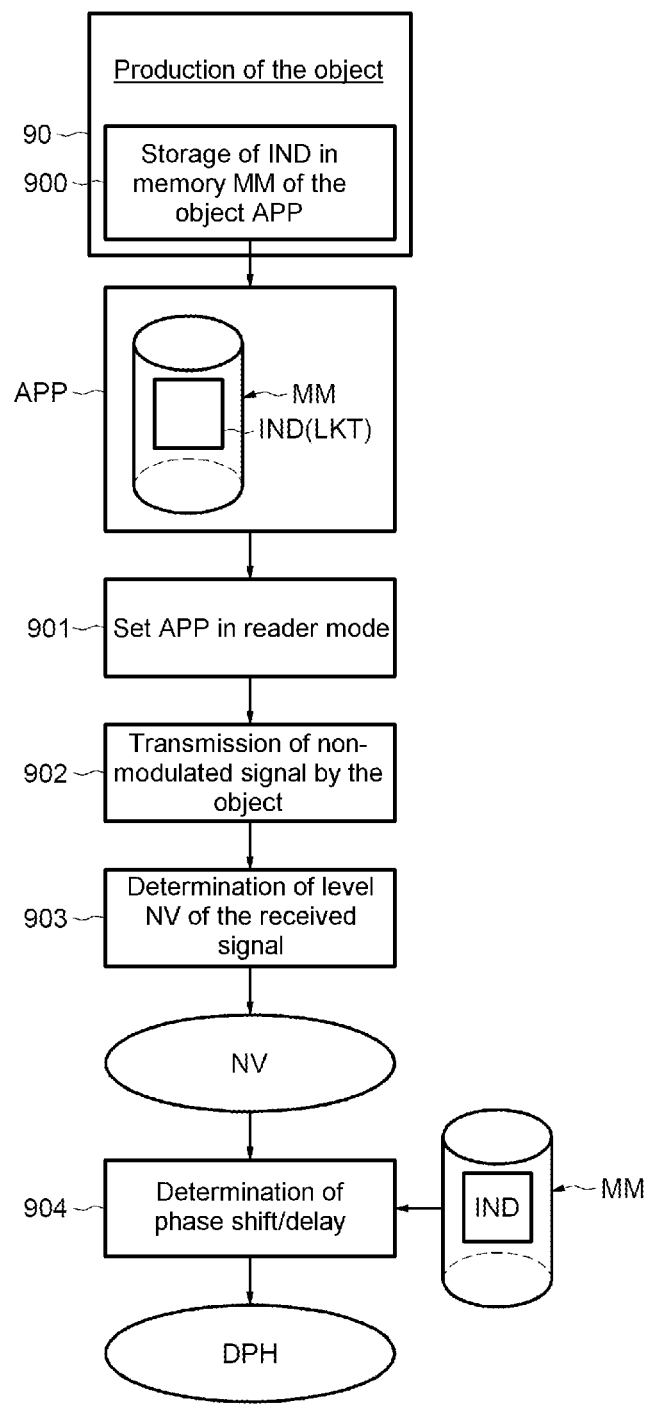

Reference will now be made more particularly to FIG. 9 which describes in particular the auto-adjustment or self-test phase of a product having been produced on a production line.

In the step (90), which represents the production steps in an overall manner, comprising in particular the assembly of the different components, there is stored in a memory MM of the object APP, the indication obtained at the end of steps (303) and (308).

Moreover, at the end of the production line there is obtained a device APP comprising the indication in its memory MM, for example the correspondence table LKT (Look-up table).

The device APP is then set in reader mode (step 901) and the device APP is made to transmit a non-modulated signal (step 902).

There is then determined, in a way analogous to what has been described above, the level NV of the signal received at the input of the component CMP step (903).

Then, on the basis of this value NV and of the indication IND, in this case the correspondence table LKT, stored in the memory, it is possible to determine the phase shift DPH, and consequently the delay to be applied in the delay element of the device APP.

At this stage, the device has therefore been calibrated and this has been done without it being necessary to use any reader whatsoever or any signal whatsoever coming from a reader.

The measurement of a characteristic obtained solely from the signal transmitted by the object makes it possible, with the indication stored in memory, to carry out the phase shift adjustment.

Moreover, even though this characteristic has been descried as being a signal level received at the input of the controller, other characteristics are possible, such as for example the phase of the transmitted signal, or the consumption during the transmission.

Moreover, this calibration is carried out just once, which dispenses with the need to repeat it during each subsequent communication with a reader.

What is claimed is:

1. A method for adjusting an object capable of contactless communication with a reader by active load modulation, the method comprising:
   providing a reference object structurally and functionally analogous to the object, the reference object comprising a reference antenna and a reference resonant circuit tuned to a reference resonant frequency;
   determining reference phase shifts within the reference object for different frequencies within a range of frequencies about the reference resonant frequency, the determining making it possible to obtain resultant phase shifts that are zero or equal to pi to within a tolerance between a signal transmitted by the reference antenna of the reference object to a test reader and a signal received from the test reader at a level of the reference antenna;
   storing, in a memory of the object, an indication linking the reference phase shifts with reference characteristics obtained based on signals uniquely transmitted by the reference object; and
   performing, by the object, an auto-adjustment of the phase shift within the object based on the stored indication and a characteristic obtained based on a signal uniquely transmitted by the object, the characteristic being of the same type as the reference characteristic.

2. The method according to claim 1, wherein the reference resonant circuit comprises a reference controller connected to a reference antenna via a reference impedance matching circuit, the reference phase shifts being phase shifts between signals transmitted at an output of the reference controller and signals received at an input of the reference controller.

3. The method according to claim 2, wherein the reference characteristics comprise reference levels of received signals resulting from the signals uniquely transmitted by the reference object and the characteristic comprises a level of a received signal resulting from the signal uniquely transmitted by the object.

4. The method according to claim 3, wherein the reference levels of the received signals are reference levels of signals received at the input of the reference controller and the level of a received signal resulting from the signal uniquely transmitted by the object is the level of the signal received at an input of a controller of the object.

5. The method according to claim 4, wherein the reference object is capable of operating in reader mode and capable of operating in card mode, determining the reference phase shifts comprising:
   setting the reference object in the card mode;
   transmitting a test signal from the test reader for each frequency of the range of frequencies;
   receiving, by the test reader, a response signal transmitted by the reference object;
   adjusting the phase shift in the reference object in order to obtain an amplitude of modulation higher in absolute value than a threshold;
   setting the reference object in the reader mode;
   transmitting, for each frequency of the range of frequencies, a non-modulated signal having the frequency from the reference object;
   determining the reference level of the signal received by the reference controller because of the transmission; and
   determining a relationship of correspondence between the different values of reference levels of the received signals and the corresponding values of reference phase shifts, the stored indication being representative of the relationship.

6. The method according to claim 5, wherein the indication comprises a table of correspondence between the different values of reference levels of the received signals and the corresponding values of reference phase shifts.

7. The method according to claim 5, wherein the relationship is a straight line and the indication comprises values making it possible to characterize the straight line.

8. The method according to claim 4, wherein the object is capable of operating in a reader mode or in a card mode, the auto-adjustment comprising:
   setting the object in the reader mode;
   transmitting, by the object, a non-modulated signal at a frequency of the resonant circuit of the object;
   determining the level of the signal received by the controller of the object; and
   adjusting the phase shift based on the level and of the stored indication.

9. The method according to claim 1, wherein the resonant circuit of the object comprises a controller connected to an antenna by an impedance matching circuit, the resonant circuit having a resonant frequency, wherein a signal transmitted by the antenna of the object stems from an initial signal generated within the controller, and the auto-adjustment of the phase shift comprises an adjustment of a delay on the initial signal.

10. The method according to claim 1, wherein the object is a mobile telephone or a tablet.

11. The method according to claim 1, wherein:
   the reference object is capable of operating in reader mode and capable of operating in card mode;
   determining the reference phase shifts comprises
      setting the reference object in the card mode,
      transmitting a test signal from the test reader for each frequency of the range of frequencies,
      receiving, by the test reader, a response signal transmitted by the reference object,
      adjusting the phase shift in the reference object in order to obtain an amplitude of modulation higher in absolute value than a threshold,
      setting the reference object in the reader mode, transmitting, for each frequency of the range of frequencies, a non-modulated signal having the frequency from the reference object, determining the reference level of the signal received by the reference controller because of the transmission, and determining a relationship of correspondence between the different values of reference levels of the received signals and the corresponding values of reference phase shifts, the stored indication being representative of the relationship; and performing the auto-adjustment comprises setting the object in the reader mode, transmitting, by the object, a non-modulated signal at a frequency of the resonant circuit of the object, determining the level of the signal received by the controller of the object, and adjusting the phase shift based on the level and of the stored indication.

12. An object capable of contactless communication with a reader by active charge modulation, the object comprising:

an antenna;

an impedance matching circuit;

a controller connected to the antenna through the impedance matching circuit, the antenna, the impedance matching circuit and the controller together forming a resonant circuit having a resonant frequency; and a memory;

wherein the controller is configured to cause the object to transmit, at an output of the controller and in the absence of a signal received from a reader, a signal uniquely transmitted by the object at the resonant frequency;

determine, at an input of the controller, a characteristic obtained from the signal uniquely transmitted by the object; and perform, by the controller, an adjustment of a phase shift within the object based on the characteristic and an indication stored in the memory, the indication linking values of phase shifts with values of the characteristic.

13. The object according to claim 12, wherein the phase shift is a phase shift between a signal transmitted at an output of the controller and a signal received at an input of the controller.

14. The object according to claim 12, wherein the characteristic comprises a level of the signal received at an input of the controller resulting from the signal uniquely transmitted by the object.

15. The object according to claim 14, wherein the object is capable of operating in a reader mode or in a card mode and wherein, the controller is configured to:

set the object in the reader mode;

cause the object to transmit a non-modulated signal at the resonant frequency;

determining the level of the signal received at the input of the controller; and perform the adjustment of the phase shift between the transmitted signal and the signal received based on the level of the received signal and the stored indication.

16. The object according to claim 15, wherein the indication comprises a table of correspondence between different values of levels of received signals and corresponding values representative of the phase shifts.

17. The object according to claim 15, wherein the indication comprises parameters making it possible to characterize a straight line representative of the values of phase shifts as a function of values of levels of received signals.

18. The object according to claim 12, wherein the controller comprises an adjustable delay element disposed in a transmission path of the signals and a circuit configured to adjust the value of the delay in such a way as to obtain a desired phase shift.

19. The object according to claim 12, wherein the controller is compatible with a near field communication (NFC) technology.

20. The object according to claim 12, wherein the object is a mobile telephone or a tablet.

21. A method for adjusting an object capable of contactless communication with a reader by active load modulation, the method comprising:

transmitting, at an output of a controller of the object and in the absence of a signal received from a reader, a signal uniquely transmitted by the object at a resonant frequency of the object;

determining, at an input of the controller, a characteristic obtained from the signal uniquely transmitted by the object; and performing, by the controller, an adjustment of a phase shift within the object based on the characteristic and an indication stored in a memory of the object, the indication linking values of phase shifts with values of the characteristic.

22. The method according to claim 21, wherein the indication stored in the memory comprises an indication determined by a reference object that is structurally and functionally analogous to the object, the reference object comprising a reference antenna and a reference resonant circuit tuned to a reference resonant frequency.

23. The method according to claim 22, wherein the indication is determined by the reference object by determining reference phase shifts within the reference object for different frequencies within a range of frequencies about the reference resonant frequency, the determining making it possible to obtain resultant phase shifts that are zero or equal to pi to within a tolerance between a signal transmitted by the reference antenna of the reference object to a test reader and a signal received from the test reader at a level of the reference antenna, wherein the indication links the reference phase shifts with reference characteristics obtained based on signals uniquely transmitted by the reference object.

24. The method according to claim 23, wherein the reference characteristics comprise reference levels of received signals resulting from the signals uniquely transmitted by the reference object and the characteristic comprises a level of a received signal resulting from the signal uniquely transmitted by the object.

25. The method according to claim 21, wherein the object is capable of operating in a reader mode or in a card mode;

wherein the transmitting is performed while the object is in the reader mode;

wherein the transmitting comprises transmitting a non-modulated signal at the resonant frequency;

wherein the determining comprises determining the level of the signal received by the object; and the adjusting comprises adjusting the phase shift based on the level and the stored indication.

26. The method according to claim 21, wherein the object comprises a resonant circuit that comprises the controller connected to an antenna by an impedance matching circuit and wherein a signal transmitted by the antenna of the object stems from an initial signal generated within the controller, and wherein the adjustment comprises an adjustment of a delay on the initial signal.

\* \* \* \* \*